Figure 1:
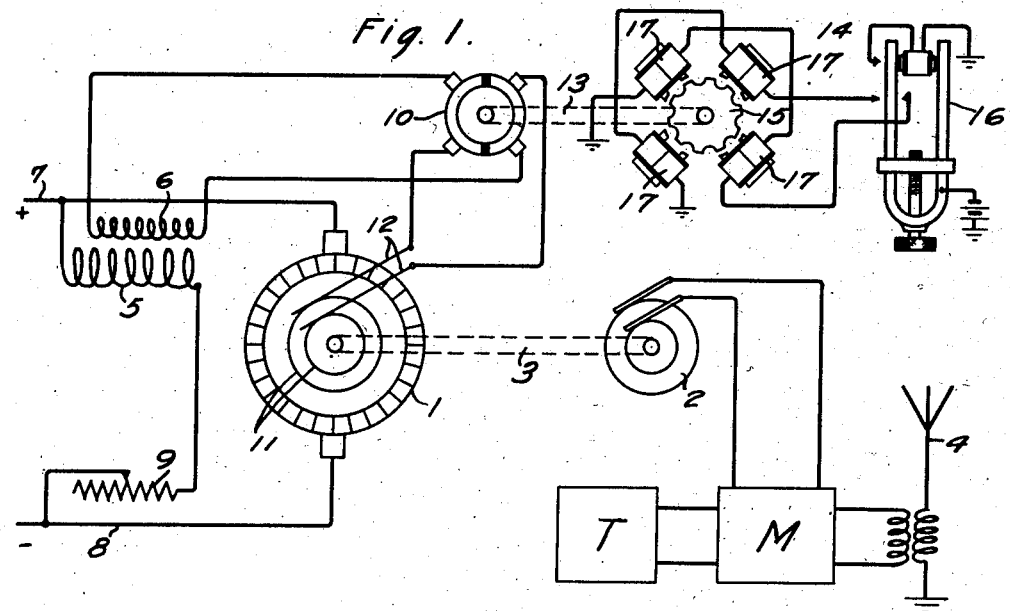

Nov. 16, 1926.

R. V. L. HARTLEY 1,606,764

SPEED REGULATION

Filed Sept. 7, 1922

Inventor:
Ralph V. L. Hartley
by E. W. Griggs Att'y

Patented Nov. 16, 1926.

1,606,764

UNITED STATES PATENT OFFICE.

RALPH V. L. HARTLEY, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

SPEED REGULATION.

Application filed September 7, 1922. Serial No. 586,622.

The present invention relates to speed regulation or control, and particularly to the regulation of a member the speed of rotation of which is dependent upon the effective field current of electromagnetic means, or upon other supply current, such as in the case of an electric motor or a system comprising an electric motor.

It is an object of the invention to provide simple and effective arrangements for maintaining the speed of a motor or system under control of an auxiliary member of standard frequency or speed, which may be of relatively very small power compared with the controlled or main system.

A feature of the invention is the provision for utilizing the energy of the main system for controlling the speed of the system, the auxiliary or controlling member serving to alter the form or effect of the control current to cause a change in speed of the main system.

A further feature of the invention is the use of a mechanical system of simple design, and specifically of a commutating device, for the auxiliary or controlling member for changing the form or effect of the control current.

Other objects and features will appear from the more detailed description hereinafter.

In the specific embodiment of the invention to be described, an electric motor is provided with a main and an auxiliary field winding, the auxiliary field winding being supplied with alternating current from the armature of the motor or from a generator driven by the motor or from some other alternating current source the speed of which is dependent upon the speed of said motor, and a commutator driven by an auxiliary rotating member of standard speed is interposed in the supply circuit of the auxiliary field winding. The commutating rate is made to bear some definite relation to the frequency of this control current, although this relation is not necessarily fixed by the constants of the system but admits of some choice. It is preferable so to relate the commutating rate to the frequency of the control current that an increase in frequency of the control current produces due to the commutating, an excess of average current in one direction through the auxiliary or correcting field winding, while a decrease in frequency of the control current produces an excess of average current in the opposite direction through the correcting winding. This change in the average current in the correcting winding has the effect of strengthening or weakening the motor field depending on the direction of the change in the average correcting current. Any tendency for a variation in speed of the motor may then be opposed by the excess of average current of proper sign in the correcting winding.

Figure 2:
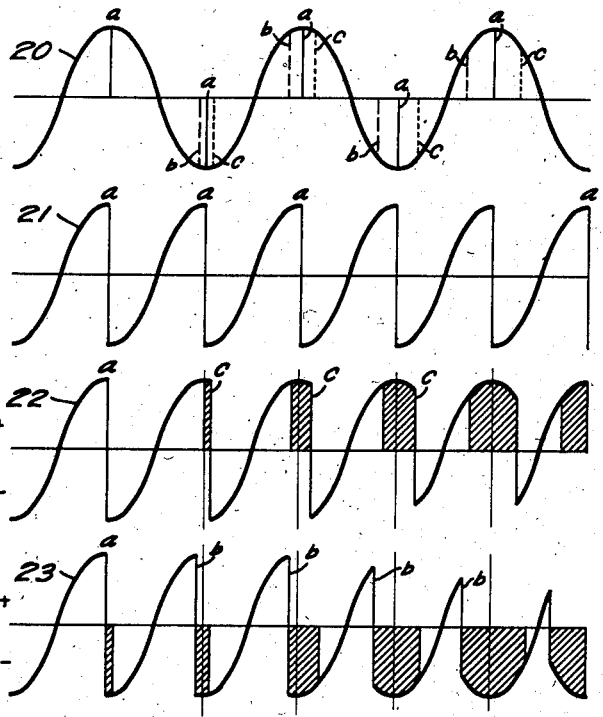

In the drawing Fig. 1 is a schematic representation of a system embodying the invention, and Fig. 2 shows curves illustrative of the operation of the circuit of Fig. 1.

In Fig. 1 the motor diagrammatically indicated at 1 is shown arranged for driving a generator indicated at 2 through the medium of shaft 3. The generator 2 is assumed to be a radio-frequency generator and is shown connected for supplying radio-frequency waves to the modulator M in the radio-transmitting terminal comprising besides the modulator, the antenna 4 and the transmitter T which may be a telephone or other type of transmitter. It is obvious that the shaft 3 may be arranged to drive any other desired apparatus, the dynamo 2 and the system T, M, 4 being indicated merely by way of example.

The motor 1 comprises the armature attached to the shaft 3, and the field windings 5 and 6. The winding 5 is the main field winding and is connected across the direct current supply mains 7, 8 through the variable resistance 9. The winding 6 is an auxiliary or correcting winding and is employed in a manner to be described, for accelerating or retarding the motor a relatively small amount to correct for variations in the motor speed. The armature of the motor 1 carries a pair of slip rings 11 (similar to the case of a rotary converter) for supplying alternating current energy from the motor armature to its correcting winding 6 through the medium of the commutator 10. The brushes 12 bearing on the slip rings 11 are connected to a pair of diametrically opposite brushes of the commutator 10 and the terminals of windings 6 are connected to the other two brushes of the commutator.

The commutator 10 is driven at a constant speed through shaft 13 by the standard-speed motor 14. Any suitable constant-speed driving means might be used for the commutator 10, the motor shown consisting of a Lacour or phonic-wheel 15 driven from the tuning-fork 16, in accordance with well known practice. This electrically driven fork supplies impulses at constant frequency to opposite pairs of the magnets 17 which cause the wheel 15 to rotate at constant speed.

The operation will be described with the aid of the curves in Fig. 2. The motor 1 is given a rough adjustment by the rheostat 9 or any other suitable means until its speed is approximately that which is desired to be maintained. The standard speed motor 14 is assumed to be rotating and driving the commutator 10 at a constant speed. The curve 20 represents the armature current of the motor 1, but as stated above, the current employed for control purposes might be derived from a generator driven by the motor 1 or from any other source so long as it has a frequency dependent on the speed of the motor 1. It is preferable, although not necessary, so to adjust the speed of the motor 14 or the driving connection to the commutator 10 or the number of segments on the commutator, that the control current when of proper frequency is commutated every cycle and at the peak value as indicated at $a, a$, on curve 20. Commutating the current in this manner gives a current of the form shown at 21, and this current is normally supplied to the auxiliary field winding 6. The constants of the motor 1, such as the inertia of the armature and the relative change of field produced by the current 21, are so proportioned with respect to the frequency of the current 21 that this current has no effect on the speed of the motor. A change in speed of the motor 1 relative to that of commutator 10, however, produces a marked change in the form of the curve 21 and enables the control current with its altered wave form to exert a correcting influence on the speed of the armature. It is simpler in considering the curves to assume that the speed of the motor 1 remains constant and that the speed of commutator 10 changes, and this answers equally well for purposes of explanation, it only being necessary to remember that an assumed increase in the speed of commutator 10 really means a decrease in the motor speed and vice versa.

Considering first the effect of a decrease in speed of commutator 10 (or in reality an increase in the motor speed) the effect is a delayed commutation so that the wave 20 is reversed at some point $c, c$, instead of at the exact peak value $a, a$. As a result a correcting current of the form shown by curve 22 is produced. In this curve, the shaded portion of each cycle represents the time of current flow in the positive direction in excess of the time of current flow in the negative direction for that cycle. The effect of an increase in motor speed and consequently of delayed commutating is that there is immediately an increase in the average current in the positive direction through the winding 6. This winding is so arranged that an increase of positive current has a retarding effect on the motor speed. Conversely a relatively accelerated commutation as at $b, b$ due to an increase in speed of the commutator 10 (or in reality a slowing down of the motor 1) results in a wave form corresponding to curve 23 for the correction current. The shaded portions of this curve show at a glance that the first effect of a slowing down of the motor is to produce an excess of negative current in the winding 6 and this current has the effect of increasing the motor speed tending to restore the speed to its desired constant value.

If the curve 22 were extended far enough to the right, on the assumption of the same delayed rate of commutation, after a certain number of cycles there would appear an excess of negative current such as is indicated by curve 23. In other words the gradually increasing shaded portions of either curve 22 or 23 represents a long cycle alternating from excess average positive current to excess average negative current. It is important to note that a change in motor speed, and hence in relative rate of commutation, in one direction initiates one half of this long cycle of excess average current and a change of speed in the other direction initiates the opposite half of the long cycle of variation. The relative strength of the correcting field for given current, the inertia of the moving parts of the system, as well as the other constants of the system, should be such that the correction in speed is accomplished in less time than one half of this long cycle, that is, before the excess average current in the correcting winding changes direction. The period of this long cycle of excess average current is of course, not fixed but is shorter the greater the deviation of motor speed from the commutator speed.

While the above description and the curves assume an actual and considerable deviation of the motor speed from its normal value, it will be understood that in practice the correcting arrangement can be given the degree of sensitiveness that may be desired and that for practical purposes the motor speed may in reality be maintained substantially constant.

With the motor 1 running at constant speed the generator 2 will cause a wave of constant wave-length to be radiated from the antenna 4. Constancy of wave-length is important for many reasons especially where sharply tuned receivers are used or where the available frequency range is limited. The wave to be radiated may be controlled in any suitable manner from the transmitter T.

It is obvious that the correcting system which has been described is capable of general application and also that it admits of various changes being made in its arrangement without departing from the invention. While the preferred manner of commutating the control current has been described, it is obvious that other manners of commutating as well as other forms of commutators and driving arrangements may be used in place of those described.

What is claimed is:

1. In a speed controlling system, a main rotating system, an auxiliary rotating system, means to derive a current wave from the main rotating system, means controlled by the auxiliary rotating system to convert said derived wave into an unsymmetrical alternating current wave and to return the converted wave to said main system, and means associated with said main system, and responsive to the said converted wave for controlling the speed of rotation of the main system.

2. In a synchronizing system a mechanism undergoing a periodic cycle, means to generate an alternating current the frequency of which is determined by the frequency of said cycle, a second mechanism undergoing a periodic cycle determined independently of said first mechanism, means for converting said alternating current into an alternating current of a different form in accordance with the cycle of said second mechanism and means dependent upon the form of the converted alternating current for regulating the frequency of the periodic cycle of said first-mentioned mechanism.

3. In a synchronizing system, a rotating member, means associated with said member for generating an alternating current the frequency of which is determined by the rate of rotation of said member, an independent rotating member, means under control of said second rotating member for converting said alternating current into an alternating current of a different form, and means dependent upon the current so converted for determining the rate of rotation of said first rotating member.

4. In a synchronizing system, a rotating member, an electric motor for driving said member, said motor comprising a field winding, means associated with said member for supplying a symmetrical alternating current to said field winding of a frequency determined by the rate of rotation of said member, a second constantly rotating member having a speed of rotation determined independently of first rotating member, and means controlled by said second rotating member for rendering said alternating current to said field winding unsymmetrical in response to variation in speed of said motor, to vary the resultant field intensity of said motor.

5. In a synchronizing system, a rotating member, means to generate an alternating current having a frequency dependent upon the speed of rotation of said member, means for periodically reversing said alternating current at a constant rate independently determined, to produce a current of different form, symmetrical or unsymmetrical about the zero axis depending upon whether the frequency of said alternating current remains constant or undergoes a variation, and means responsive to current unsymmetrical about the zero axis for changing the speed of rotation of said member.

6. In combination, a rotating member, electro-magnetic means comprising a winding for determining the speed of rotation of said member, means to generate a current of a frequency depending upon the speed of rotation of said member and to supply said current to said winding, a second rotating member having a constant speed of rotation determined independently of said first rotating member, means controlled by said second rotating member and interposed between the generating means and said winding for causing said current to have a symmetrical or unsymmetrical form about the zero axis dependent upon whether the frequency of said current remains constant or undergoes a variation, said winding being responsive to unsymmetrical current to change the speed of rotation of said first member.

7. In combination, an electric motor having a main field winding and an auxiliary field winding, means to supply to said auxiliary field winding an alternating current of a frequency dependent upon the speed of rotation of said motor, a current-reversing device in the supply path of said current for said winding for periodically reversing said current at a constant rate, whereby a current is produced in said auxiliary field winding ineffective or effective in altering the speed of rotation of said motor according as the frequency of the alternating current remains constant or varies.

8. In combination an electric motor having a main and a correcting field winding, means to generate an alternating current of a frequency dependent upon the speed of rotation of said motor, a constantly rotating commutator for continuously changing alternating current into alternating current of a different form, a circuit including said means, said correcting field winding and said commutator, whereby the average current per cycle through said correcting winding is zero or positive or negative depending respectively upon whether the speed of rotation of said motor remains constant or varies in one sense or the other.

9. The method of compensating for deviations the speed of a rotating device from a normal predetermined speed which comprises continuously generating a symmetrical alternating wave under control of said device, commutating said wave at a fixed rate which is proportional to said normal speed and utilizing any preponderance of one polarity of said commutated wave to effect a change in the speed of the rotating device in a direction determined by which polarity preponderates.

10. The method of maintaining synchronism between a rotating device and a standard speed member which comprises continuously generating a control alternating current of a frequency determined by the speed of said rotating device, commutating said current at a rate determined by the speed of said standard speed member and in such manner that the current is reversed at or near its peak amplitude according as said rotating device is rotating at or near synchronous speed, respectively, and utilizing the commutated current to produce zero resultant effect or a retarding or accelerating effect on the speed of said rotating device according as said alternating current is reversed at its peak amplitude or at a point in its cycle slightly to one or the other side of the point of peak amplitude respectively.

11. The method of maintaining synchronism between a rotating device and a standard speed member which comprises generating a control alternating current of a frequency determined by said rotating device, commutating said current at a rate determined by the speed of said standard speed member in such manner that at synchronous speed said alternating current is reversed at its peak amplitude whereby a non-sinusoidal alternating current of twice the fundamental frequency of said control alternating current is produced, and utilizing the commutated current to produce zero resultant effect on the speed of said rotating device so long as the control current is commutated at its peak amplitude, and to produce an acceleration or retardation in the speed of said device according as said control current is commutated at instants removed by a small fraction of a period from the instant of peak amplitude and to one or the other side respectively, of the instant of said peak amplitude whereby said rotating device is maintained rotating at substantially synchronous speed.

In witness whereof, I hereunto subscribe my name this 6th day of September, A. D. 1922.

RALPH V. L. HARTLEY.